(12) United States Patent
Wang (10) Patent No.: US 11,320,682 B2
(45) Date of Patent: May 3, 2022

(54) DISPLAY PANEL AND DISPLAY DEVICE

(71) Applicants: HKC CORPORATION LIMITED, Shenzhen (CN); CHONGQING HKC OPTOELECTRONICS TECHNOLOGY CO., LTD., Chongqing (CN)

(72) Inventor: Huiping Wang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 673 days.

(21) Appl. No.: 16/314,863

(22) PCT Filed: Nov. 1, 2018

(86) PCT No.: PCT/CN2018/113321
§ 371 (c)(1),
(2) Date: Jan. 3, 2019

(87) PCT Pub. No.: WO2020/042336
PCT Pub. Date: Mar. 5, 2020

(65) Prior Publication Data
US 2021/0325717 A1    Oct. 21, 2021

(30) Foreign Application Priority Data
Aug. 27, 2018  (CN) .......................... 201821390933.6

(51) Int. Cl.
*G02F 1/1333*    (2006.01)
*G02F 1/1362*    (2006.01)

(52) U.S. Cl.
CPC ...... *G02F 1/133331* (2021.01); *G02F 1/1333* (2013.01); *G02F 1/136286* (2013.01); *G02F 2201/50* (2013.01)

(58) Field of Classification Search
None
See application file for complete search history.

(56) References Cited

U.S. PATENT DOCUMENTS

2002/0192883 A1   12/2002   Lee et al.
2018/0203318 A1*  7/2018    Abe ................. G02F 1/133345

FOREIGN PATENT DOCUMENTS

| CN | 202585418 U  | 12/2012 |
| CN | 202631908 U  | 12/2012 |
| CN | 104362153 A  | 2/2015  |
| CN | 107450213 A  | 12/2017 |
| JP | 2009229969 A | 10/2009 |

OTHER PUBLICATIONS

Xin Tan, the International Searching Authority written comments, May 2019, CN.

* cited by examiner

*Primary Examiner* — Richard H Kim (57) ABSTRACT

The present disclosure provides a display panel and a display device. The display panel includes a first substrate, and the first substrate includes a glass substrate. A first metal layer, an insulating layer, a second metal layer, and a passivation protective layer are sequentially formed on a surface of the glass substrate.

19 Claims, 5 Drawing Sheets

DISPLAY PANEL AND DISPLAY DEVICE

This application claims foreign priority to Chinese Patent Application No. CN201821390933.6, filed on Aug. 27, 2018 in the State Intellectual Property Office of China entitled "DISPLAY PANEL AND DISPLAY DEVICE", and the entire contents of which is hereby incorporated by reference.

TECHNICAL FIELD

The present disclosure relates to a field of display technology, and in particular to a display panel and a display device.

BACKGROUND

The description herein provides only background information related to this application, but does not necessarily constitute the existing technology.

A display apparatus has advantages, such as having a thin body, saving-power, low radiation, and is widely used. A conventional display apparatus mostly is a backlight display apparatus, which comprises a liquid crystal display (LCD) panel and a backlight module. Operating principle of the display apparatus is that liquid crystal (LC) molecules are disposed between two substrates, where the two substrates are parallelly disposed, and a driver voltage applies on the two substrates to control rotation direction of the LC molecules, so that light of a backlight module are refracted to generate images.

Technology development of a thin film transistor-liquid crystal display (TFT-LCD) is relatively mature in the prior art, and the TFT-LCD has economic benefits advantages. For surrounding metal wiring of the TFT-LCD, a double-layer metal wiring design is adopted to reduce resistance and prevent distortion caused by signal transmission delay.

With an advent of narrow bezels, a distance between the double-layer metal wiring disposed on the TFT-LCD to provide a common voltage and an edge of the glass substrate is also reducing. That is to say, the distance between the metal wiring and the edge of the glass substrate is reduced. Because of a limited accuracy of cutting machines, exterior gases are easily getting into an effective display area along with a corroded gap of the TFT-LCD after cut, and finally cause the TFT-LCD to display abnormality.

SUMMARY

The present disclosure provides a display panel and a display device to prevent a generation of bubbles in a display area, thereby effectively improving a display quality.

To achieve the above object, the present disclosure provides a display panel comprising a display area and an outer peripheral area. The display panel comprises:

a first substrate, a second substrate disposed opposite to the first substrate, and a liquid crystal layer sandwiched between the first substrate and the second substrate. The outer peripheral area of the first substrate comprises a glass substrate. A first metal layer is formed on the glass substrate. An insulating layer is formed on the first metal layer. A second metal layer is formed on the insulating layer. A passivation protective layer is formed on the second metal layer. The glass substrate comprises a cutting edge, and a distance between the second metal layer and the cutting edge of the glass substrate is greater than a distance between the first metal layer and the cutting edge of the glass substrate.

To achieve the above object, the present disclosure provides a display panel comprising a display area and an outer peripheral area. The display panel comprises:

a first substrate, a second substrate disposed opposite to the first substrate, and a liquid crystal layer sandwiched between the first substrate and the second substrate. The outer peripheral area of the first substrate comprises a glass substrate. A first metal layer is formed on the glass substrate. An insulating layer is formed on the first metal layer. A second metal layer is formed on the insulating layer. A passivation protective layer is formed on the second metal layer. The glass substrate comprises a cutting edge. The first metal layer comprises a first side close to the cutting edge of the glass substrate and the second metal layer comprises a second side close to the cutting edge of the glass substrate. A distance between the second side of the second metal layer and the cutting edge of the glass substrate is 1.5 microns to 2.5 microns longer than a distance of the first side of the first metal layer and the cutting edge of the glass substrate. The second side of the second metal layer and a side of the insulating layer close to the cutting edge of the glass substrate is stepped. A angle formed between a side edge of the second side of the second metal layer close to the cutting edge of the glass substrate and a bottom edge of the second metal layer ranges from 20-80 degrees. A thickness of the second metal layer is 0.5 microns.

Another object of the present disclosure is to provides a display device. The display device comprise a control component and the display panel above.

For surrounding metal wiring of the TFT-LCD, a double-layer metal wiring design is adopted to reduce a resistance and prevent a distortion caused by signal transmission delay. With an advent of a narrow bezel, a distance between the double-layer metal wiring to provide a common voltage and an edge of the glass substrate is also reduced. That is to say, the distance between the metal wiring and the edge of the glass substrate is reduced. Because of a limited accuracy of cutting machines, the cutting edge of the glass substrate is likely to be close to or very approach to a metal edge, which causes the passivation protective layer configured to protect the second metal layer to lift or fall off, thus, causing contaminants such as moisture to corrode an upper metal. Further, exterior gases are easily getting into an effective display area along with a corroded gap of the display panel, and finally resulting in display abnormality of the display panel. A distance between the second metal layer and the cutting edge of the glass substrate is greater than a distance between the first metal layer and the cutting edge of the glass substrate. After cutting, a distance between the metal wiring and the cutting edge of the glass substrate is increased, and an area of the passivation protective layer covering the second metal layer and the insulating layer is larger, which protects the metal well, and prevent the second metal layer from being corroded, thus, effectively preventing a generation of bubbles in the display area and effectively improving a display quality.

BRIEF DESCRIPTION OF DRAWINGS

The drawings are included to provide a further understanding of embodiments of the present disclosure, which form portions of the specification and are used to illustrate implementation manners of the present disclosure and are intended to illustrate operating principles of the present disclosure together with the description. Apparently, the drawings in the following description are merely some of the embodiments of the present disclosure, and those skilled in the art are able to obtain other drawings according to the drawings without contributing any inventive labor. In the drawing.

DETAILED DESCRIPTION

Specific structure and function details disclosed herein are only representative and are used for the purpose of describing exemplary embodiments of the present disclosure. However, the present disclosure may be achieved in many alternative forms and shall not be interpreted to be only limited to the embodiments described herein.

It should be understood in the description of the present disclosure that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified. In addition, the term "comprise" and any variant are intended to cover non-exclusive inclusion. It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions. The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

In the drawings, structurally similar elements are denoted by the same reference numerals.

An exemplary method is as follows:

A narrow bezel design is a trend of a development of thin film transistor-liquid crystal display (TFT-LCD). The narrow bezel is the pursuit of the market. A technology development of the TFT-LCD is relatively mature in the prior art, and the TFT-LCD has an advantage of economic benefits. For surrounding metal wiring of the TFT-LCD, a double-layer metal wiring design is adopted to reduce a resistance and prevent a distortion caused by signal transmission delay.

Figure 3:
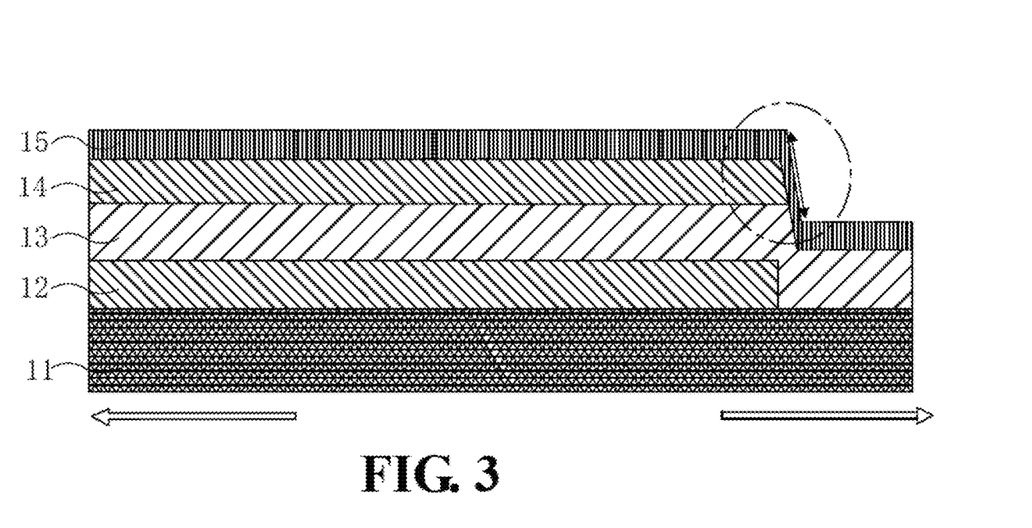
FIG. 3 is a schematic diagram of a second cross-sectional view of a risk narrow bezel (a cross-sectional view along CC' in FIG. 1) according to an embodiment of the present disclosure.
Figure 4:
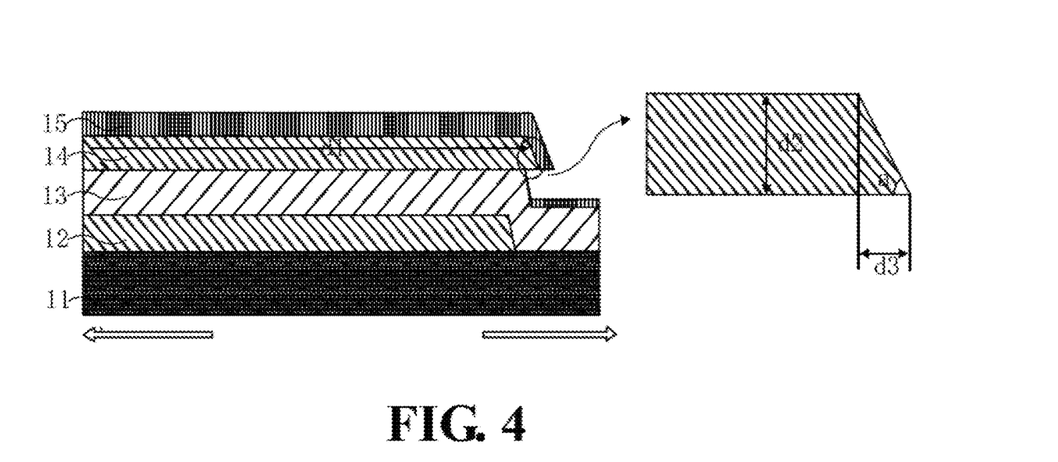
FIG. 4 is a schematic diagram of a third cross-sectional view of a risk narrow bezel (a cross-sectional view along CC' in FIG. 1) according to an embodiment of the present disclosure.
Figure 5:
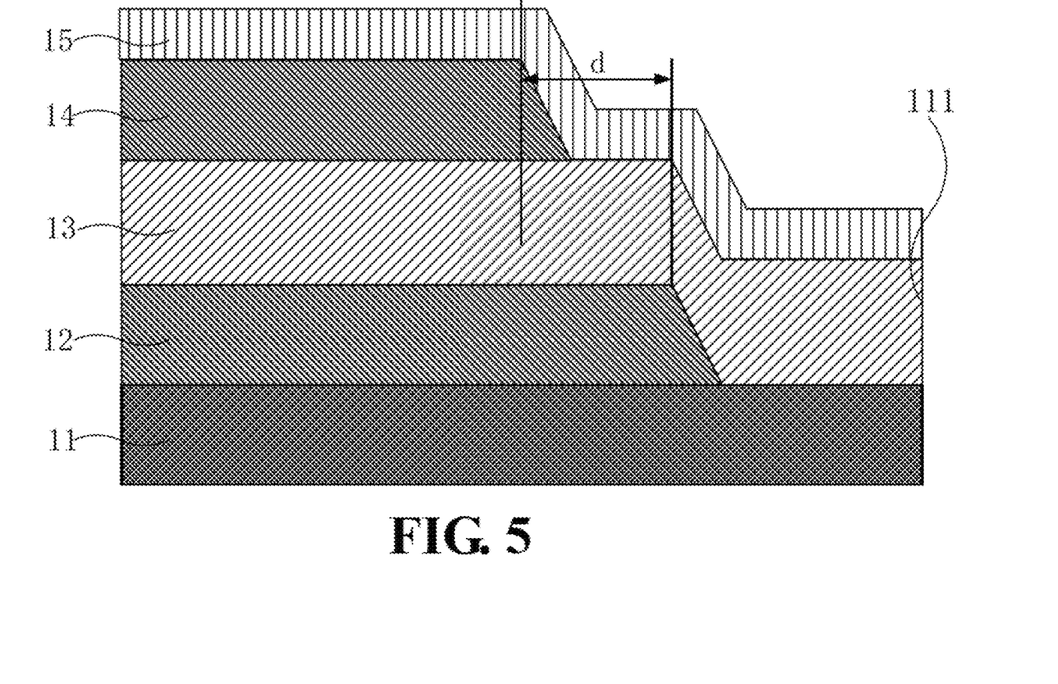
FIG. 5 is a schematic diagram showing a design of a glass substrate double-layer metal wiring according to an embodiment of the present disclosure.

With an advent of the narrow bezel and a glass substrate double-layer metal wiring design, in one aspect, a distance between a double-layer metal wiring disposed on a side of a TFT-LCD metal wiring array substrate to provide a common voltage and an edge of the glass substrate is also reducing. That is to say, the distance between the metal wiring and an cutting edge 111 of the glass substrate is reduced. Thus, contaminants such as moisture corrodes an upper metal from edges. Further, exterior gases are easily getting into an effective display area along with a corroded gap, and finally resulting in display abnormality of the TFT-LCD. On the other hand, because of a development and etching precision of the second metal layer 14, the relative position of the second metal layer 14 changes with the first metal layer 12. As shown in FIG. 3 and FIG. 4, an edge of the second metal layer 14 in FIG. 3 is aligned with an edge of a lower insulating layer 13, and a passivation protective layer 15 disposed at the edge of second metal layer 14 becomes thinner and thinner, resulting in the second metal layer 14 being easily corroded. A worst case is shown in FIG. 4, the edge of the second metal layer 14 is beyond the edge of the first metal layer 12, and a bottom surface of the second metal layer 14 forming the slope is not protected by the passivation protective layer 15, thus, the second metal layer 14 is most easily to be corroded.

To achieve the above object, the present disclosure provides a display panel 2 comprising a display area and an outer peripheral area. The display panel comprises:

a first substrate 10, a second substrate 20 disposed opposite to the first substrate 10, and a liquid crystal layer sandwiched between the first substrate 10 and the second substrate 20. The outer peripheral area of the first substrate 10 comprises a glass substrate 11. A first metal layer 12 is formed on the glass substrate 11. An insulating layer 13 is formed on the first metal layer 12. A second metal layer 14 is formed on the insulating layer 13. A passivation protective layer 15 is formed on the second metal layer 14. The glass substrate 11 comprises a cutting edge 111, and a distance between the second metal layer 14 and the cutting edge 111 of the glass substrate 11 is greater than a distance between the first metal layer 12 and the cutting edge 111 of the glass substrate 11.

For surrounding metal wiring of the glass substrate 11, the double-layer metal wiring design is adopted to reduce the resistance and prevent the distortion caused by signal transmission delay. With the advent of the narrow bezel, the distance between the double-layer metal wiring to provide a common voltage and an edge of the glass substrate is also reduced. That is to say, the distance between the metal wiring and the cutting edge 111 of the glass substrate 11 is reduced. Because of a limited accuracy of cutting machines, the cutting edge 111 of the glass substrate 11 is likely to be close to or very approach to a metal edge, which causes the passivation protective layer 15 configured to protect the second metal layer 14 to lift or fall off, thus, causing contaminants such as moisture to corrode an upper metal. Further, exterior gases are easily getting into an effective display area along with the corroded gap, and finally resulting in the display abnormality of the display panel 2. A distance between the second metal layer 14 and the cutting edge 111 of the glass substrate 11 is greater than a distance between the first metal layer 12 and the cutting edge 111 of the glass substrate 11. After cutting, a distance between the metal wiring and the cutting edge 111 of the glass substrate 11 is increased, and an area of the passivation protective layer 15 covering the second metal layer 14 and the insulating layer 13 is larger, which protects the metal well, and prevent the second metal layer 14 from being corroded, thus, effectively preventing a generation of bubbles in the display area and effectively improving a display quality.

In an alternative embodiment, the first metal layer 12 comprises a first side 121 close to the cutting edge 111 of the glass substrate 11. The second metal layer 14 comprises a second side 141 close to the cutting edge 111 of the glass substrate 11. A distance between the second side 141 of the second metal layer 14 and the cutting edge 111 of the glass substrate 11 is 1.5 microns to 2.5 microns longer than a distance of the first side 121 of the first metal layer 12 and the cutting edge 111 of the glass substrate 11.

When the distance between the second side 141 of the second metal layer 14 and the cutting edge 111 of the glass substrate 11 is less than 1.5 microns longer than the distance of the first side 121 of the first metal layer 12 and the cutting edge 111 of the glass substrate 11. When cutting, since the limited accuracy of cutting machines, the cutting edge 111 of the glass substrate 11 is likely to be close to or very approach to the metal edge, which causes the passivation protective layer 15 configured to protect the second metal layer 14 to lift or fall off, thus, causing contaminants such as moisture to corrode the upper metal. Further, exterior gases are easily getting into an effective display area along with the corroded gap, and finally resulting in the display abnormality of the display panel 2. When the distance between the second side 141 of the second metal layer 14 and the cutting edge 111 of the glass substrate 11 is more than 2.5 microns longer than the distance of the first side 121 of the first metal layer 12 and the cutting edge 111 of the glass substrate 11, a narrow bezel requirement of an ideal narrow bezel may not be realized, and a lot of glass material is wasted, resulting in an increase in production costs. When the distance between the second side 141 of the second metal layer 14 and the cutting edge 111 of the glass substrate 11 is 1.5 microns to 2.5 microns longer than the distance of the first side 121 of the first metal layer 12 and the cutting edge 111 of the glass substrate 11, the cutting edge 111 of the glass substrate 11 does not close to or very approach to the metal edge, which prevents the passivation protective layer 15 configured to protect the second metal layer 14 from lifting or falling off. Thus, the passivation protective layer 15 can well protect the second metal layer 14 when it does not lift or fall off, and contaminants such as moisture does not corrode the second metal layer 14, preventing the exterior gases from getting into an effective display area along with the corroded gap such that the display abnormality would not happened in the display panel 2. Moreover, a best utilization rate of the glass material is obtained, which saves material and cost.

In an alternative embodiment, a side of the second metal layer 14 close to the cutting edge 111 of the glass substrate 11 and a side of the insulating layer 13 close to the cutting edge 111 of the glass substrate 11 is stepped.

Because the edge of the second metal layer 14 is closer to the cutting edge relative to an edge of the insulating layer 13, both of a side edge of the insulating layer 13 forming on the second metal layer 14 and a side edge of the insulating layer 13 covering the second metal layer 14 are closer to the cutting edge 111 of the glass substrate 11 than a side edge of the second metal layer 14, of which formed two steps to ensure to ensure the thickness of the passivation protective layer 15 at the edge of the second metal layer 14. Thus, the thickness of the passivation protective layer 15 is ensured, and a adhesion of the passivation protective layer 15 is relatively good, and the passivation protective layer 15 after cutting does not easily lift or fall off, which protect the second metal layer 14 better.

In an alternative embodiment, a angle formed between a side edge of the second metal layer 14 close to the cutting edge 111 of the glass substrate 11 and a bottom edge of the second metal layer 14 ranges from 20-80 degrees.

The angle formed between the side edge of the second metal layer 14 close to the cutting edge 111 of the glass substrate 11 and the bottom edge of the second metal layer 14 ranges from 20-80 degrees. If the angel is less than 20 degrees, considering effects of exposure, development, and etching precision, the thickness of the passivation protective layer 15 at the edge of the second metal layer 14 is not ensured, and the passivation protective layer 15 is relatively thin, resulting that the second metal layer 14 is easily corrode and the exterior gases are easily getting into the effective display area along with the corroded gap, and finally resulting in the display abnormality of the display panel 2. If the angle is more than 80 degrees, a adhesion between the motivation protective layer 15 and the second metal layer 14 is relatively poor, which make the motivation protective layer 15 easily to lift, and makes the contaminants such as moisture to corrode the upper metal. Thus, the exterior gases is easily getting into the effective display area along with the corroded gap, and finally resulting in the display abnormality in the display panel 2. When the angle is in a range of 20-80 degrees, the thickness of the motivation protective layer 15 is ensured, and the adhesion between the motivation protective layer 15 and the second metal layer 14 is ensured, which prevent the passivation protective layer 15 from lifting or falling off, prevent the second metal layer 14 from being corroded, and ensure the display effect.

In an alternative embodiment, a thickness of the second metal layer 14 is 0.3-0.7 microns.

The thickness of the second metal layer 14 is 0.5 microns, and the thickness of the second metal layer 14 is not thin relative to other layers, which ensures a performance of the second metal layer 14 on the circuit. The thickness of the second metal layer 14 is not thick relative to other layers. If it is too thick, it may affect an electrical conductivity of the second metal layer 14 and it may lead to an exposure of a gate electrode when the edge of the second metal layer 14 comes into contact with the passivation protective layer 15, and further, the protection function of the passivation protective layer 15 is gone. Mainly according to that a width precision d1 of the first metal layer 12 and the second metal layer 14 is about ±1 um, a thickness precision d2 of the second metal layer 14 is about 0.5 um, the angle of the second metal layer 14 is 20-80°, and d3=d2*tan(a). Taking d1, d2, and d3 into account, a shrinkage width of the second metal layer 14 is 1.5 to 2.5 urn, which ensure the second metal layer 14 to form a step with two lower layers, ensure the thickness of the passivation protective layer 15 formed on the edge of the second metal layer 14, and prevent the second metal layer 14 from being corroded.

Figure 6:
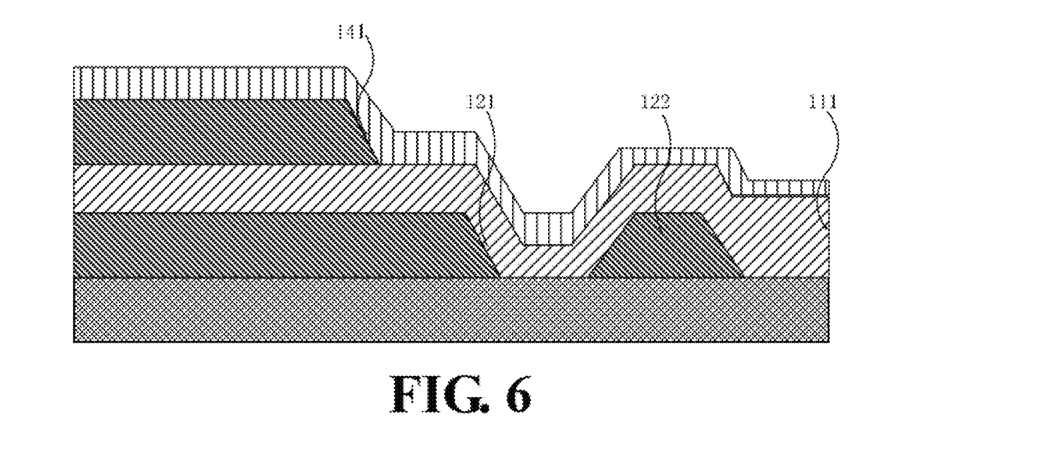
FIG. 6 is a schematic diagram of a first convex block of an embodiment of the present disclosure.

As another embodiment of the present disclosure, FIG. 6 is a schematic view of a first convex block 122 of an embodiment of the present disclosure, which is an expansion based on FIG. 1 to FIG. 5. It can be known from an conjunction of FIG. 1 to FIG. 5:

In an alternative embodiment, a first convex block 122 is disposed on the glass substrate 11. The first convex block 122 is disposed between the first side 121 of the first metal layer 12 and the first edge. The first convex block 122 and the first metal layer 12 are formed by a same process. A height of the first convex block 122 is no more than a thickness of the first metal layer 12. The first convex block 122 is insulated from a circuit disposed on the first substrate 10.

The first convex block 122 and the first metal layer 12 are formed by a same process. The first convex block 122 and the first metal layer 12 are formed by a same mask process. No additional process steps is needed, and no additional material is required. The first convex block 122 is disposed between the first side 121 of the first metal layer 12 and the first edge, and a height of the first convex block 122 is no more than a thickness of the first metal layer 12, which effectively prevent the passivation protective layer 15 from lifting, and increase a production efficiency of the display panel 2 at the same time. Moreover, the first convex block 122 is insulated from a circuit disposed on the first substrate 10. The cutting edge 111 of the glass substrate 11 is close to the first convex block 122, and the passivation protective layer 15 covers the first convex block 122. The first convex block 122 has a large contact area with the passivation protective layer 15, and has high adhesion, preventing the passivation protective layer 15 from lifting, thus preventing contamination such as moisture from corroding the second metal layer 14 and ensuring the display effect.

Figure 7:
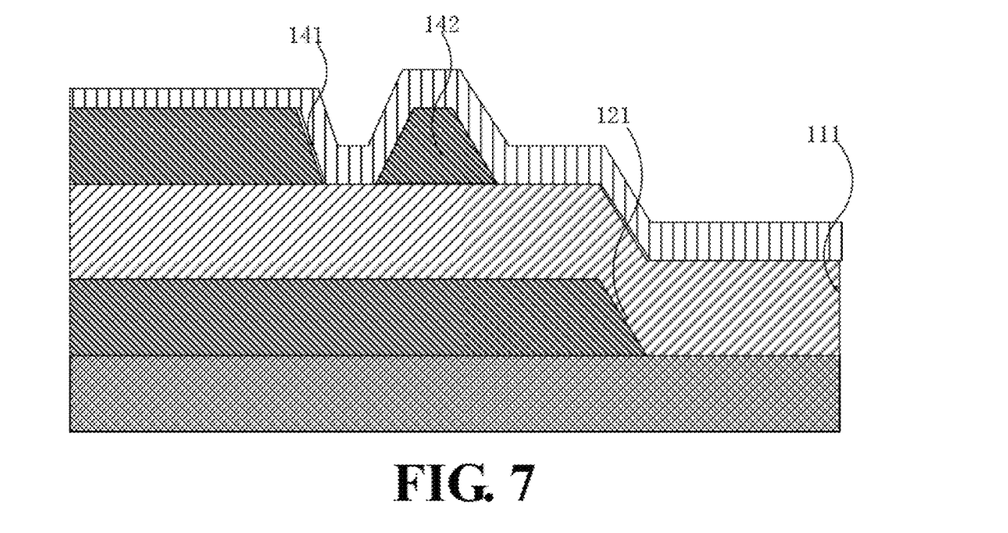
FIG. 7 is a schematic diagram of a second convex block of an embodiment of the present disclosure.

As another embodiment of the present disclosure, FIG. 7 is a schematic view of a second convex block 142 of an embodiment of the present disclosure, which is an expansion based on FIG. 1 to FIG. 5. It can be known from an conjunction of FIG. 1 to FIG. 5:

In an alternative embodiment, a second convex block 142 is disposed on the insulating layer 13. The second convex block 142 is disposed between the first side 121 of the first metal layer 12 and the second side 141 of the second metal layer 14. The second convex block 142 and the second metal layer 14 are formed by a same process. A height of the second convex block 142 is no more than a thickness of the second metal layer 14. The second convex block 142 is insulated from a circuit disposed on the first substrate 10.

The second convex block 142 is disposed between the first side 121 of the first metal layer 12 and the second side 141 of the second metal layer 14. The second convex block 142 and the second metal layer 14 are formed by a same process. And the second convex block 142 is insulated from a circuit disposed on the first substrate 10. The cutting edge 111 of the glass substrate 11 is close to the second convex block 142, and the passivation protective layer 15 covers the second convex block 142. The second convex block 142 has a large contact area with the passivation protective layer 15, and has high adhesion, preventing the passivation protective layer 15 from lifting, thus preventing contamination such as moisture from corroding the second metal layer 14.

Figure 8:
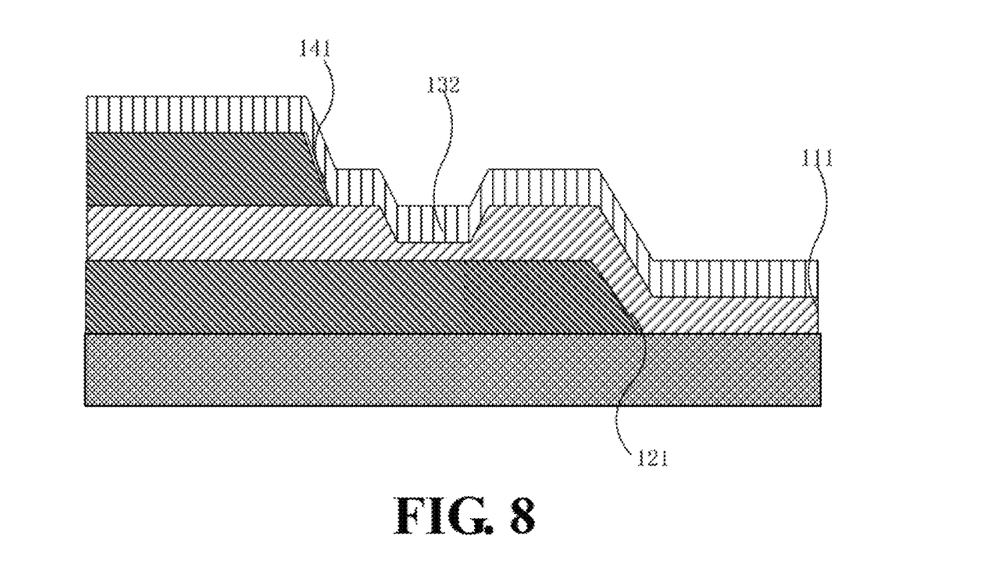
FIG. 8 is a schematic diagram of a first groove of an embodiment of the present disclosure.

As another embodiment of the present disclosure, FIG. 8 is a schematic view of a first groove 132 of an embodiment of the present disclosure, which is an expansion based on FIG. 1 to FIG. 5. It can be known from an conjunction of FIG. 1 to FIG. 5:

In an alternative embodiment, a first groove 132 is disposed on the insulating layer 13. The first groove 132 is disposed between the second side 141 of the second metal layer 14 and the first edge. The first groove 132 is recessed from the insulating layer 13 to the glass substrate 11. The first groove 132 and the insulation layer 13 are formed by a same process.

Because of the limited accuracy of cutting machines, the cutting edge 111 of the glass substrate 11 is likely to be close to or very approach to the metal edge, which causes the passivation protective layer 15 to lift or fall off. Thus, the first groove 132 is disposed on the insulating layer 13 to increase a contact area of the passivation protective layer 15 and the insulating layer 13, and the passivation protective layer 15 is not easily to lift or fall off, which prevent the contamination such as moisture from corroding the second metal layer 14.

Figure 9:
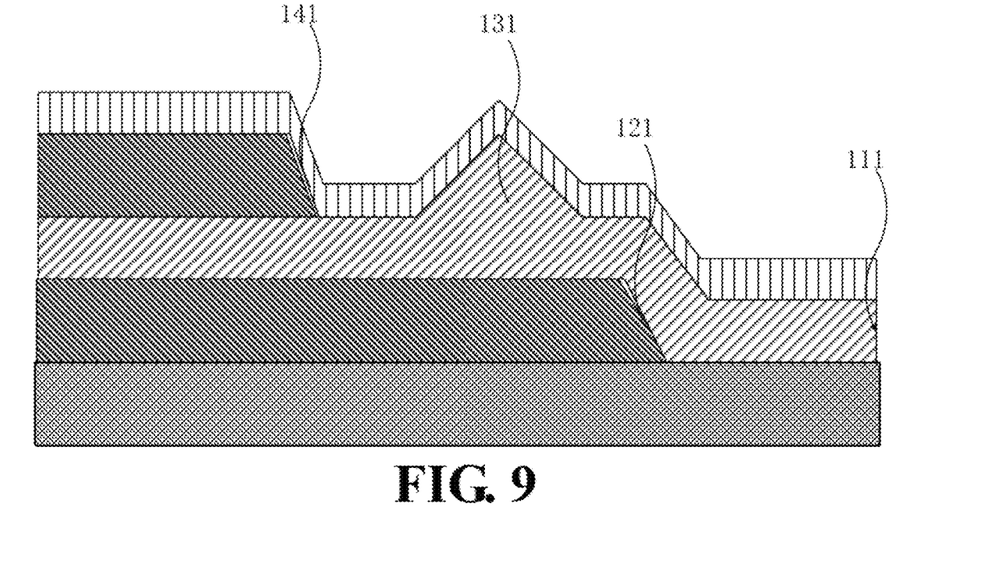
FIG. 9 is a schematic diagram of a first bulge of an embodiment of the present disclosure.

As another embodiment of the present disclosure, FIG. 9 is a schematic view of a first bulge 131 of an embodiment of the present disclosure, which is an expansion based on FIG. 1 to FIG. 5. It can be known from an conjunction of FIG. 1 to FIG. 5:

In an alternative embodiment, the first bulge 131 is arranged on the insulating layer 13. The first bulge 131 is disposed between the second side 141 of the second metal layer 14 and the first edge. The first bulge 131 is raised from a direction form the insulating layer 13 to the second metal layer 14. The first bulge 131 and the insulating layer 13 are formed by a same process.

Because of the limited accuracy of cutting machines, the cutting edge 111 of the glass substrate 11 is likely to be close to or very approach to the metal edge, which causes the passivation protective layer 15 to lift or fall off. Thus, the convex structure is disposed on the insulating layer 13 to increase the contact area of the passivation protective layer 15 and the insulating layer 13, and the passivation protective layer 15 is not easily to lift or fall off after cutting, which prevent the contamination such as moisture from corroding the second metal layer 14.

In an alternative embodiment, a height of the first bulge 131 relative to the insulating layer 13 is no more than the thickness of the second metal layer 14.

Because of the limited accuracy of cutting machines, the cutting edge 111 of the glass substrate 11 is likely to be close to or very approach to the metal edge, which causes the passivation protective layer 15 to lift or fall off. Thus, the convex structure is disposed on the insulating layer 13 to increase the contact area of the passivation protective layer 15 and the insulating layer 13, the adhesion is good, and the passivation protective layer 15 is not easily to lift or fall off after cutting. In addition, when a vacuum alignment is formed, the first bulge 131 prevents a height of the passivation protective layer 15 herein from being higher than other areas, this preventing the convex structure herein from being stressed so much, preventing the convex structure herein from being easily damaged, and preventing the protection function of the passivation protective layer 15 to the second metal layer 14 from being lost.

Figure 10:
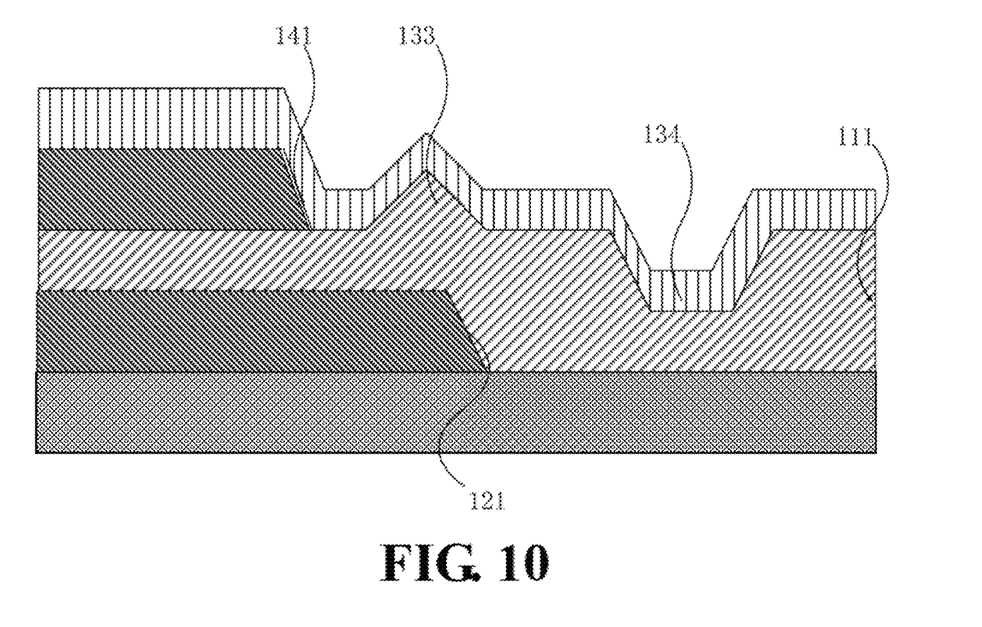
FIG. 10 is a schematic diagram of a second groove and a second bulge of an embodiment of the present disclosure.

In an alternative embodiment, a second groove 134 and a second bulge 133 are disposed on the insulating layer 13. The second groove 134 and the second bulge 133 are disposed between the second side 141 of the second metal layer 14 and the first edge.

Because of the limited accuracy of cutting machines, the cutting edge 111 of the glass substrate 11 is likely to be close to or very approach to the metal edge, which causes the passivation protective layer 15 to lift or fall off. Thus, the convex structure and the groove is disposed on the insulating layer 13 to increase the contact area of the passivation protective layer 15 and the insulating layer 13, and the passivation protective layer 15 is not easily to lift or fall off after cutting, which prevent the contamination such as moisture from corroding the upper metal layers.

To achieve the above object, the present disclosure provides a display panel 2 comprising a display area and an outer peripheral area. The display panel comprises:

a first substrate 10, a second substrate 20 disposed opposite to the first substrate 10, and a liquid crystal layer 20 sandwiched between the first substrate 10 and the second substrate 20. The outer peripheral area of the first substrate 10 comprises a glass substrate 11. A first metal layer 12 is formed on the glass substrate 11. An insulating layer 13 is formed on the first metal layer 12. A second metal layer 14 is formed on the insulating layer 13. A passivation protective layer 15 is formed on the second metal layer 14. The glass substrate 11 comprises a cutting edge 111 of the glass substrate 11. The first metal layer 12 comprises a first side 121 close to the cutting edge 111 of the glass substrate 11. The second metal layer 14 comprises a second side 141 close to the cutting edge 111 of the glass substrate 11. A distance between the second side 141 of the second metal layer 14 and the cutting edge 111 of the glass substrate 11 is 1.5 microns to 2.5 microns longer than a distance of the first side 121 of the first metal layer 12 and the cutting edge 111 of the glass substrate 11. The second side 141 of the second metal layer 14 and a side of the insulating layer 13 close to the cutting edge 111 of the glass substrate 11 is stepped. A\angle formed between the second side 141 of the second metal layer 14 and a bottom edge of the second metal layer 14 ranges from 20-80 degrees. The thickness of the second metal layer 14 is 0.5 microns.

For surrounding metal wiring of the glass substrate 11, the double-layer metal wiring design is adopted to reduce the resistance and prevent the distortion caused by signal transmission delay. With the advent of the narrow bezel, the distance between the double-layer metal wiring to provide a common voltage and an edge of the glass substrate is also reduced. That is to say, the distance between the metal wiring and the cutting edge 111 of the glass substrate 11 is reduced. Because of a limited accuracy of cutting machines, the cutting edge 111 of the glass substrate 11 is likely to be close to or very approach to a metal edge, which causes the passivation protective layer 15 configured to protect the second metal layer 14 to lift or fall off, thus, causing contaminants such as moisture to corrode an upper metal. Further, exterior gases are easily getting into an effective display area along with the corroded gap, and finally resulting in the display abnormality of the display panel 2. Mainly according to that a width precision d1 of the first metal layer 12 is about ±1 um, a thickness precision d2 of the second metal layer 14 is about 0.5 urn, the angle of the second metal layer 14 is 20-80°, and d3=d2*tan(a). Taking d1, d2, and d3 into account, a shrinkage width of the second metal layer 14 is 1.5 to 2.5 um. That is to say, the distance between the second side 141 of the second metal layer 14 and the cutting edge 111 of the glass substrate 11 is 1.5 microns to 2.5 microns longer than the distance of the first side 121 of the first metal layer 12 and the cutting edge 111 of the glass substrate 11, which ensure the second metal layer 14 to form a step with two lower layers, ensure the thickness of the passivation protective layer 15 formed on the edge of the second metal layer 14, and prevent the second metal layer 14 from being corroded. The distance between the second metal layer 14 and the cutting edge 111 of the glass substrate 11 is greater than the distance between the first metal layer 12 and the cutting edge 111 of the glass substrate 11. After cutting, the distance between the metal wiring and the cutting edge 111 of the glass substrate 11 is increased, and the area of the passivation protective layer 15 covering the second metal layer 14 and the insulating layer 13 is larger, which protects the metal well, and prevent the second metal layer 14 from being corroded, thus effectively preventing the generation of bubbles in the display area and effectively improving the display quality.

Figure 1:
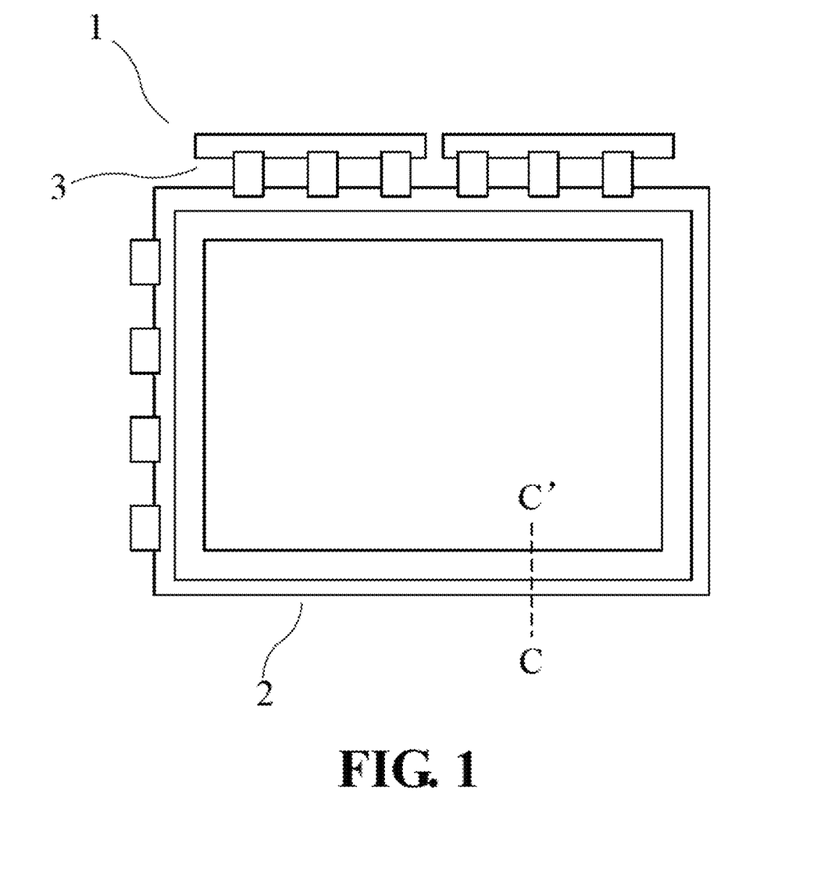
FIG. 1 is a schematic diagram of a display device according to an embodiment of the present disclosure.
Figure 2:
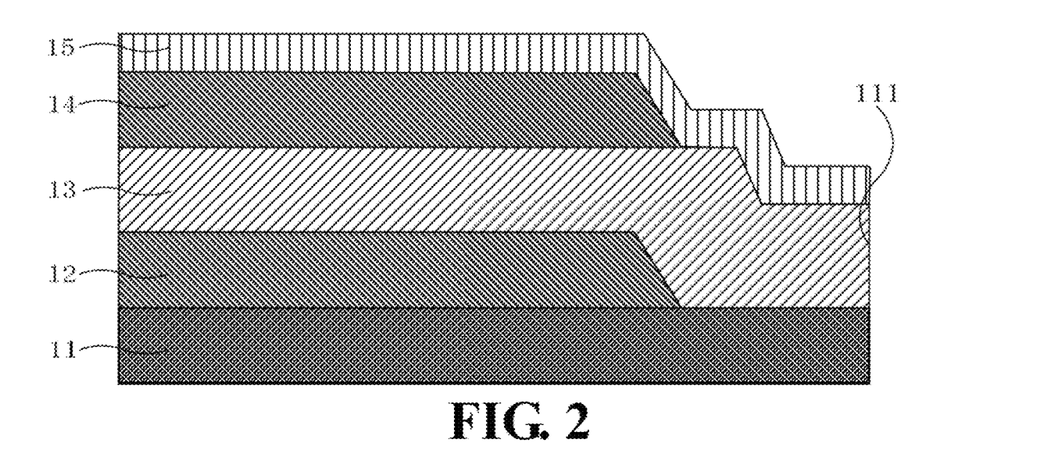
FIG. 2 is a schematic diagram of a cross-sectional view of an ideal narrow bezel (a cross-sectional view along CC' in FIG. 1) of an embodiment of the present disclosure.

Another object of the present disclosure is to provide a display device 1. The display device comprises a control component 3 and the display panel 2 described above.

A panel of the present disclosure is selected from a twisted nematic (TN) panel, an in-plane switching (IPS) panel, and a vertical alignment (VA) panel. Of course, other types of panels are used as long as they are applicable The above content is a further detailed description of the present disclosure in conjunction with the specific preferred embodiments, and the specific implementation of the present disclosure is not limited to the description. It will be apparent to those skilled in the art that a number of simple deductions or substitutions may be made without departing from the conception of the present disclosure, which should be considered as being within the scope of the present disclosure.

What is claimed is:

1. A display panel comprising a display area and an outer peripheral area, wherein the display panel comprises:
    a first substrate;
    a second substrate disposed opposite to the first substrate; and
    a liquid crystal layer sandwiched between the first substrate and the second substrate;
    wherein the outer peripheral area of the first substrate comprises a glass substrate; a first metal layer is formed on the glass substrate; an insulating layer is formed on the first metal layer; a second metal layer is formed on the insulating layer; a passivation protective layer is formed on the second metal layer;
    wherein the glass substrate comprises a cutting edge; a distance between the second metal layer and the cutting edge of the glass substrate is greater than a distance between the first metal layer and the cutting edge of the glass substrate;
    wherein a first convex block is disposed on the glass substrate; the first metal layer comprises a first side close to the cutting edge of the glass substrate; the first convex block is disposed between the first side of the first metal layer and the cutting edge of the glass substrate; the first convex block and the first metal layer are formed by a same process; a height of the first convex block is no more than a thickness of the first metal layer; the first convex block is insulated from a circuit disposed on the first substrate.

2. The display panel according to claim 1, wherein the second metal layer comprises a second side close to the cutting edge of the glass substrate; a distance between the second side of the second metal layer and the cutting edge of the glass substrate is 1.5 microns to 2.5 microns longer than a distance of the first side of the first metal layer and the cutting edge of the glass substrate.

3. The display panel according to claim 2, wherein the distance between the second side of the second metal layer and the cutting edge of the glass substrate is 2 microns longer than the distance of the first side of the first metal layer and the cutting edge of the glass substrate.

4. The display panel according to claim 2, wherein a first bulge is arranged on the insulating layer; the first bulge is disposed between the second side of the second metal layer and the cutting edge of the glass substrate; the first bulge is raised from a direction form the insulating layer to the second metal layer; the first bulge and the insulating layer are formed by a same process.

5. The display panel according to claim 4, wherein a height of the first bulge relative to the insulating layer is no more than a thickness of the second metal layer.

6. The display panel according to claim 2, wherein a groove and a bulge are disposed on the insulating layer; the groove and the bulge are disposed between the second side of the second metal layer and the cutting edge of the glass substrate.

7. The display panel according to claim 1, wherein the second side of the second metal layer close to the cutting edge of the glass substrate and a side of the insulating layer close to the cutting edge of the glass substrate are stepped.

8. The display panel according to claim 1, wherein an angle formed between a side edge of the second metal layer close to the cutting edge of the glass substrate and a bottom edge of the second metal layer ranges from 20-80 degrees.

9. The display panel according to claim 1, wherein the second metal layer ranges from 0.3-0.7 microns in thickness.

10. The display panel according to claim 1, wherein a thickness of the second metal layer is 0.5 microns.

11. The display panel according to claim 1, wherein a second convex block is disposed on the insulating layer; the second metal layer comprises a second side close to the cutting edge of the glass substrate; the second convex block is disposed between the first side of the first metal layer and the second side of the second metal layer; the second convex block and the second metal layer are formed by a same process; a height of the second convex block is no more than a thickness of the second metal layer; the second convex block is insulated from a circuit disposed on the first substrate.

12. The display panel according to claim 1, wherein a first groove is disposed on the insulating layer; the second metal layer comprises a second side close to the cutting edge of the glass substrate; the first groove is disposed between the second side of the second metal layer and the cutting edge of the glass substrate; the first groove is recessed from the insulating layer to the glass substrate; the first groove and the insulation layer are formed by a same process.

13. A display device comprising a control component and the display according to claim 1.

14. The display device according to claim 13, wherein the second metal layer comprises a second side close to the cutting edge of the glass substrate; a distance between the second side of the second metal layer and the cutting edge of the glass substrate is 1.5 microns to 2.5 microns longer than a distance of the first side of the first metal layer and the cutting edge of the glass substrate; —the second side of the second metal layer and a side of the insulating layer close to the cutting edge of the glass substrate is stepped; an angle formed between a side edge of the second side of the second metal layer close to the cutting edge of the glass substrate and a bottom edge of the second metal layer ranges from 20-80 degrees; a thickness of the second metal layer is 0.5 microns.

15. The display device according to claim 14, wherein a first bulge is arranged on the insulating layer; the first bulge is disposed between the second side of the second metal layer and the cutting edge of the glass substrate; the first bulge is raised from a direction form the insulating layer to the second metal layer; the first bulge and the insulating layer are formed by a same process; a height of the first bulge relative to the insulating layer is no more than a thickness of the second metal layer.

16. The display device according to claim 14, wherein a second convex block is disposed on the insulating layer; the second convex block is disposed between the first side of the first metal layer and the second side of the second metal layer; the second convex block and the second metal layer are formed by a same process; a height of the second convex block is no more than a thickness of the second metal layer; the second convex block is insulated from a circuit disposed on the first substrate.

17. The display device according to claim 14, wherein a groove and a bulge are disposed on the insulating layer; the groove and the bulge are disposed between the second side of the second metal layer and the cutting edge of the glass substrate.

18. A display panel comprising a display area and an outer peripheral area, wherein the display panel comprises:
 a first substrate;
 a second substrate disposed opposite to the first substrate; and
 a liquid crystal layer sandwiched between the first substrate and the second substrate;
 wherein the outer peripheral area of the first substrate comprises a glass substrate; a first metal layer is formed on the glass substrate; an insulating layer is formed on the first metal layer; a second metal layer is formed on the insulating layer; a passivation protective layer is formed on the second metal layer;
 wherein the glass substrate comprises a cutting edge; a distance between the second metal layer and the cutting edge of the glass substrate is greater than a distance between the first metal layer and the cutting edge of the glass substrate;
 wherein a convex block is disposed on the insulating layer; the first metal layer comprises a first side close to the cutting edge of the glass substrate; the second metal layer comprises a second side close to the cutting edge of the glass substrate; the convex block is disposed between the first side of the first metal layer and the second side of the second metal layer; the convex block and the second metal layer are formed by a same process; a height of the convex block is no more than a thickness of the second metal layer; and the convex block is insulated from a circuit disposed on the first substrate.

19. A display panel comprising a display area and an outer peripheral area, wherein the display panel comprises:
 a first substrate;
 a second substrate disposed opposite to the first substrate; and
 a liquid crystal layer sandwiched between the first substrate and the second substrate;
 wherein the outer peripheral area of the first substrate comprises a glass substrate; a first metal layer is formed on the glass substrate; an insulating layer is formed on the first metal layer; a second metal layer is formed on the insulating layer; a passivation protective layer is formed on the second metal layer;

wherein the glass substrate comprises a cutting edge; a distance between the second metal layer and the cutting edge of the glass substrate is greater than a distance between the first metal layer and the cutting edge of the glass substrate;

wherein a first groove is disposed on the insulating layer; the second metal layer comprises a second side close to the cutting edge of the glass substrate; the first groove is disposed between the second side of the second metal layer and the cutting edge of the glass substrate; the first groove is recessed from the insulating layer to the glass substrate; and the first groove and the insulating layer are formed by a same process.

* * * * *